United States Patent Office 2,944,871
Patented July 12, 1960

2,944,871
NEW COLOURING PROCESS

John Reginald Atkinson, Gerald Booth, Eric Leslie Johnson, and Walter Percival Mills, Manchester, England, assignors to Imperial Chemical Industries Limited, London, England, a corporation of Great Britain No Drawing. Filed Sept. 24, 1958, Ser. No. 762,923

Claims priority, application Great Britain Oct. 4, 1957

11 Claims. (Cl. 8—41)

This invention relates to a new colouring process and more particularly it relates to a new process for the production of fast colourations on textile materials made from synthetic polymers.

It has been found that water-insoluble azo dyestuffs containing alkyl groups substituted by epoxy, chloro or bromo groups when applied from aqueous dispersion to textile materials made from synthetic polymers, for example polyamides and basically modified polyacrylonitriles, give colourations of unexpectedly high fastness to wet treatments. Colourations effected on these textile materials by the use of water-insoluble azo dyestuffs not containing these groups are in general deficient in fastness to wet treatments, and the colourations obtained by the use of water-insoluble azo dyestuffs containing these groups are markedly superior in fastness to wet treatments not only in that they retain their strength of shade better but also in that staining of adjacent textile materials is much reduced. It seems probable that this fastness is due at least in part to chemical reaction of the dyestuff with the textile material.

According to the invention there is provided a process for the colouration of synthetic polymeric textile materials which comprises treating a synthetic polymeric textile material with a water-insoluble azo dyestuff containing at least one alkoxy or alkylamino radical which is substituted by an epoxy group or a chlorine or bromine atom.

As examples of the alkoxy or alkylamino radicals substituted by an epoxy group or a chlorine or bromine atom there may be mentioned β-chloroethoxy, β-bromoethoxy, β-chloropropoxy, β-bromopropoxy, γ-chloro-β-hydroxypropoxy, γ-bromo-β-hydroxypropoxy, β-γ-epoxypropoxy, β-chloroethylamino, β-bromoethylamino, β-bromopropylamino, β-chloropropylamino, γ-chloro-β-hydroxypropylamino, γ-bromo-β-hydroxypropylamino, β:γ-epoxypropylamino, N:N-di(β-chloroethyl)amino, N:N-di(β-bromoethyl)amino, N:N-di(γ-chloro-β-hydroxypropyl)amino, N:N-di(γ-bromo-β-hydroxypropyl)amino, N:N-di(β:γ-epoxypropyl)amino, N-β-chloroethyl-N-β-methoxyethylamino, N-β-bromoethyl-N-ethylamino, N-γ-bromo-β-hydroxypropyl-N-β-cyanoethylamino, N-β:γ-epoxypropyl-N-methylamino, N-γ-chloro-β-hydroxypropyl-N-β-ethoxyethylamino and N-γ-chloro-β-hydroxypropyl-N-β-hydroxyethylamino.

The water-insoluble azo dyestuff as hereinbefore defined, or mixtures thereof may be applied to a synthetic polymeric textile material by a dyeing or printing process and it is preferred to use the water-insoluble azo dyestuff in the form of an aqueous dispersion or a re-dispersible powder. The aqueous dispersion of the water-insoluble azo dyestuff may be obtained by gravel-milling the dyestuff in water in the presence of a dispersing agent, for example the sodium salt of sulphonated naphthalene formaldehyde condensation products, sulphosuccinic acid esters, Turkey red oil and condensation products of alkyl-phenols with ethylene oxide, and if desired in the presence of a protective colloid, for example dextrin. If desired the aqueous dispersion so obtained may be converted to a re-dispersible powder by any of the processes known for forming re-dispersible powders.

The application of the water-insoluble azo dyestuff as hereinbefore defined to the synthetic polymeric textile material by a dyeing process may be carried out by immersing the synthetic polymeric textile material in a dyebath containing an aqueous dispersion of the water-insoluble azo dyestuff and heating at a temperature at or near the boiling point of the dyebath, for example at a temperature between 75° and 100° C. If desired the dyebath can be heated at temperatures above 100° C., for example at a temperature between 100° and 130° C. under super-atmospheric pressure. The dyed textile material is then removed from the dyebath, rinsed in water, and dried.

The water-insoluble azo dyestuffs, as hereinbefore defined, may also be applied to the synthetic polymeric textile material by a printing process which may be effected by printing the synthetic polymeric textile material with a thickened printing paste containing an aqueous dispersion of the water-insoluble azo dyestuff. The printing paste may be thickened with any of the usual thickening agents, for example methyl cellulose, starch, locust bean gum, Nafka crystal gum, or sodium alginate, and may contain normal adjuvants for printing pastes such as urea, thiourea or thiodiglycol or adjuvants used for the application of water-insoluble dyes such as methylated spirits, sodium meta-nitrobenzenesulphonate or aqueous emulsions of sulphonated oils.

The printing paste may be conveniently applied to the synthetic polymeric textile material by printing with block, spray, stencil, screen or roller, preferably drying the printed material, and if desired steaming at atmospheric pressure or in a closed vessel at super-atmospheric pressure when a temperature above 100° C., preferably between 110° and 130° C., is required.

When the synthetic polymeric textile material is coloured with a water-insoluble azo dyestuff as hereinbefore defined, which also contains a primary amino group then, if desired, the dyed textile material may be treated with an aqueous solution of nitrous acid and a coupling component, whereby another azo dyestuff is formed in situ on the textile material.

As examples of synthetic polymeric textile materials which may be used in the process of the invention there may be mentioned textile materials, comprising polyamides, for example polyhexamethylene adipamide and the polymer from caprolactam and modified polyacrylonitriles.

The water-insoluble azo dyestuffs, as hereinbefore defined, which are used in the process of the invention may be obtained by diazotising a primary aromatic amine and coupling the diazo compound so obtained with a coupling component, the primary aromatic amine and coupling component being so chosen that the resultant azo dyestuff is free from sulphonic acid and carboxylic acid groups and contains at least one alkoxy or alkylamino radicals substituted by an epoxy group or a chlorine or bromine atom.

As examples of primary aromatic amines which may be used to obtain the water-insoluble azo dyestuffs there may be mentioned p-nitroaniline, o- and p-aminobenzonitrile, 4-amino-3-chlorobenzonitrile, 2-amino-5-cyanobenzotrifluoride, 2:4-dicyanoaniline, o- and p-aminophenyl methyl sulphone, 4-amino-3-chlorophenyl ethyl sulphone, 4-amino-3-chlorophenyl β-hydroxyethyl sulphone, 2:4-di(methylsulphonyl)aniline, 2:5-di(ethylsulphonyl)aniline, 3:4-di(ethylsulphonyl)aniline, 2-amino-5-methylsulphonylbenzotrifluoride, p-aminobenzenesulphonamide, 4-amino-3-chlorobenzenesulphonamide, 4-amino-3-chlorobenzenesulphon-β-hydroxyethylamide, 2- amino-6-methylsulphonylbenzthiazole, 2-amino-6 - nitrobenzthiazole, 2 - amino - 5 - nitrothiazole, p - (β - chloroethoxy)aniline, p - (γ - chloro-β-hydroxypropoxy)aniline, p-(γ-bromo-β-hydroxypropoxy)aniline, p - (γ-bromopropoxy)aniline and p-(β:γ-epoxypropoxy)aniline.

As examples of coupling components there may be mentioned 1-N:N-di-(β-chloroethyl)amino-3-methylbenzene, 1 - N:N-di(β-bromoethyl)amino-3-methylbenzene, N-ethyl-N-γ-chloro-β-hydroxypropylaniline, N-ethyl - N-β-γ-epoxypropylaniline, N:N - di(γ-chloro-β-hydroxypropyl)aniline, N:N-di(β:γ-epoxypropyl)aniline, 1-N:N-di-(γ-chloro-β-hydroxypropyl)-amino-2-methoxy - 5 - methylbenzene, 1 - N:N-di(γ-chloro-β-hydroxypropyl)amino-3-methylbenzene, 1-N:N-di-(γ-chloro-β-hydroxypropyl)-amino-3-chlorobenzene, N:N - di - (γ-bromo-β-hydroxypropyl)aniline, N - ethyl-N-(γ-bromo-β-hydroxypropyl)-aniline, 1 - N - (γ-chloro-β-hydroxypropyl)-3-methylbenzene, 1-N-(γ-chloro-β-hydroxypropyl)aminonaphthalene, 1-N-β-methoxyethyl-N-(γ - chloro - β - hydroxypropyl)-amino-3-methylbenzene, N-ethyl-N-β-bromoethylaniline, 1-N-ethyl-N - (β:γ - epoxypropyl)amino - 3 - methylbenzene, 1 - N-ethyl-N-(γ-bromo-β-hydroxypropyl)amino-3-methylbenzene, N-β-hydroxyethyl-N-γ-chloro-β-hydroxypropylaniline, 1 - N:N - di(γ - chloro-β-hydroxypropyl)-amino-2-methoxy - 5 - acetamidobenzene, 1 - N:N - di(γ-chloro-β-hydroxypropyl)amino-3 - acetamidobenzene, 3-N:N-di(γ-chloro - β - hydroxypropyl)aminobenzotrifluoride, cresidine, dimethylaniline, N-ethyl-N-β-hydroxyethylaniline, p-cresol, 3-methyl-5-pyrazolone, 3-carbethoxy-5-pyrazolone, 1 - o - tolyl-3-methyl-5-pyrazolone and 2:4-dihydroxyquinoline.

Alternatively those water-insoluble azo dyestuffs, as hereinbefore defined, which contain a β:γ-epoxyalkoxy or β:γ-epoxyalkylamino group may be obtained by treating the corresponding azo dyestuff containing a γ-chloro-β-hydroxyalkoxy or γ - chloro - β - hydroxyalkylamino group respectively with potassium hydroxide.

By the process of the invention there are obtained on synthetic polymeric textile materials bright yellow to blue shades possessing excellent fastness to wet treatments and to light.

A preferred class of the water-insoluble azo dyestuffs, as hereinbefore defined, which may be used in the process of the invention are the water-insoluble monoazo dyestuffs of the formula:

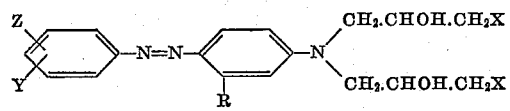

wherein R represents an alkyl or acylamino group or a hydrogen or a halogen atom, X represents a chlorine or a bromine atom, Y represents a cyano, alkylsulphonyl, aminosulphonyl or substituted aminosulphonyl group which is situated in an ortho or para position to the azo bond, and Z represents a hydrogen or a halogen atom or a trifluoromethyl, cyano, alkylsulphonyl, aminosulphonyl or substituted aminosulphonyl group.

As examples of the atoms and groups represented by R there may be mentioned hydrogen, chlorine, bromine, methyl and acetylamino.

As examples of the groups represented by Y there may be mentioned cyano, methylsulphonyl, ethylsulphonyl, β - hydroxyethylsulphonyl, aminosulphonyl, dimethylaminosulphonyl and β-hydroxyethylaminosulphonyl and as examples of the atoms and groups represented by Z there may be mentioned, chlorine, bromine, trifluoromethyl, cyano, methylsulphonyl, ethylsulphonyl and aminosulphonyl.

The preferred water-insoluble azo dyestuffs of the above formula when applied to synthetic polyamide textile materials by the process of the invention give bright orange to rubine shades which have excellent fastness to light and to washing.

The invention is illustrated but not limited by the following examples in which parts and percentages are by weight.

*Example 1*

1 part of 4-nitro-4'-N:N-di(γ-chloro-β-hydroxypropyl) amino azobenzene is dispersed in 20 parts of water by milling in the presence of a sodium salt of a sulphonated naphthalene formaldehyde condensation product and the dispersion so obtained is added to 4,000 parts of water containing 4 parts of a condensate of ethylene oxide with a fatty alcohol. 100 parts of polyamide textile material are placed in the dyebath so obtained and the dyebath is then heated to 95° C. and maintained at that temperature for 60 minutes. The polyamide textile material is then rinsed in water, immersed for 30 minutes in a hot aqueous solution containing 0.2% of sodium carbonate and 0.1% of a condensate of ethylene oxide with an alkyl phenol, again rinsed in water and dried. The polyamide textile material is dyed a red shade of very good fastness to washing.

*Example 2*

In place of the 1 part of the dyestuff used in Example 1 there is used 1 part of 4-nitro-4'-[N-ethyl-N-(3-chloro-2-hydroxypropyl)]-aminoazobenzene or 1 part of 4-nitro-4'-(N-ethyl-N-2:3 - epoxypropyl)aminoazobenzene when the polyamide textile material is dyed in red shades of very good fastness to washing.

*Example 3*

1 part of 4-nitro-4'-N:N-di(γ-chloro-β-hydroxypropyl) amino azobenzene is dispersed in 20 parts of water as described in Example 1 and the dispersion so obtained is added to 4000 parts of water containing 1.5 parts of oleyl sodium sulphate at 50° C. 100 parts of the basically modified polyacrylonitrile textile material manufactured by the Chemstrand Corporation and sold under their trade mark "Acrilan" are placed in the dyebath so obtained and the dyebath is then heated to a temperature between 98° C. and 100° C. and maintained at that temperature for 60 minutes. The modified polyacrylonitrile textile material is then rinsed in water, immersed for 30 minutes in a hot aqueous solution containing 0.05% of sodium carbonate and 0.2% of a condensate of ethylene oxide with an alkyl phenol, again rinsed in water, and dried. The modified polyacrylonitrile textile material is dyed a red shade of very good fastness to wet treatments.

*Example 4*

In place of the 1 part of the dyestuff used in Example 1 there is used 1 part of 4-nitro-4'-N:N-di(β:γ-epoxypropyl)aminoazobenzene, when the polyamide textile material is similarly dyed a red shade possessing similar fastness properties.

The following table gives further examples of the shades obtained on polyamide textile material when the water-insoluble azo dyestuffs, obtained by diazotising the amine listed in the second column of the table and coupling with the coupling component listed in the third column of the table, are applied to polyamide textile materials by the method described in Example 1.

| Example | Amine | Coupling Component | Shade on Polyamide Textile Materials |
|---|---|---|---|
| 5 | 4-amino-3-chlorophenyl ethyl sulphone. | N:N-di(γ-chloro-β-hydroxypropyl) aniline. | Reddish-orange. |
| 6 | 2-amino-5-methylsulphonyl benztrifluoride. | do | Scarlet. |
| 7 | 2:4-di(methylsulphonyl)aniline. | do | Red. |
| 8 | 2-amino-6-methylsulphonyl benzthiazole. | do | Reddish-violet. |
| 9 | 2-amino-5-nitro-thiazole. | do | Reddish-blue. |

| Example | Amine | Coupling Component | Shade on Polyamide Textile Materials |
|---|---|---|---|
| 10 | 2-amino-5-cyano-benzotrifluoride. | N:N-di(γ-chloro-β-hydroxypropyl)aniline. | Scarlet. |
| 11 | ----do---- | N-ethyl-N-γ-chloro-β-hydroxypropylaniline. | Red. |
| 12 | 4-amino-3-chlorophenyl methyl sulphone. | ----do---- | Scarlet. |
| 13 | 2-amino-5-methylsulphonyl benzotrifluoride. | ----do---- | Do. |
| 14 | 2:4-di(methylsulphonyl)aniline. | ----do---- | Red. |
| 15 | 2-amino-5-nitro-thiazole. | ----do---- | Blue. |
| 16 | p-nitroaniline | N:N-di(γ-bromo-β-hydroxypropyl)aniline. | Red. |
| 17 | ----do---- | N-ethyl-N-γ-bromo-β-hydroxypropylaniline. | Do. |
| 18 | 2-amino-5-nitro-thiazole. | N-ethyl-N-γ-bromo-β-hydroxypropylaniline. | Dark blue. |
| 19 | 4-amino-3-chlorobenzene sulphonamide. | N-ethyl-N-β-bromoethylaniline. | Orange. |
| 20 | 4-amino-3-chlorophenyl β-hydroxyethyl sulphone. | 1-N:N-di(β-bromoethyl)amino-3-methylbenzene. | Scarlet. |
| 21 | p-nitroaniline | N:N-di(β:γ-epoxypropyl)aniline. | Red. |
| 22 | 2-amino-5-cyano-benzotrifluoride. | ----do---- | Do. |
| 23 | 2-amino-6-methylsulphonyl benzothiazole. | ----do---- | Reddish-violet. |
| 24 | 2-amino-5-nitro-thiazole. | ----do---- | Violet. |
| 25 | 4-amino-3-chlorophenyl ethyl sulphone. | N-ethyl-N-β:γ-epoxypropylaniline. | Scarlet. |
| 26 | 2-amino-5-cyano-benzotrifluoride. | ----do---- | Red. |
| 27 | 2-amino-5-nitro-thiazole. | ----do---- | Blue. |
| 28 | 4-(γ-chloro-β-hydroxypropoxy)aniline. | p-cresol | Yellow. |
| 29 | ----do---- | 3-methyl-5-pyrazolone. | Do. |
| 30 | 4-(γ-bromo-β-hydroxypropoxy)aniline. | ----do---- | Do. |
| 31 | p-nitroaniline | 1-N:N-di(γ-chloro-β-hydroxypropyl)amino-3-methylbenzene. | Red. |
| 32 | 4-amino-3-chlorophenyl ethyl sulphone. | ----do---- | Scarlet. |
| 33 | 4-amino-3-chlorobenzene sulphonamide. | ----do---- | Reddish-orange. |
| 34 | 2-amino-5-nitro-thiazole. | ----do---- | Blue. |
| 35 | p-nitroaniline | 1-N:N-di(γ-chloro-β-hydroxypropyl)amino-2-methoxy-5-methyl-benzene. | Maroon. |
| 36 | 4-amino-3-chlorophenyl ethyl sulphone. | ----do---- | Do. |
| 37 | 2-amino-5-cyano-benzotrifluoride. | ----do---- | Bluish-red. |
| 38 | 2-amino-5-nitrothiazole. | ----do---- | Bluish-grey. |
| 39 | p-nitroaniline | 1-N:N-di(γ-chloro-β-hydroxypropyl)amino-3-chlorobenzene. | Red. |
| 40 | 4-amino-3-chlorophenyl ethyl sulphone. | ----do---- | Orange. |
| 41 | 2-amino-5-nitrothiazole. | ----do---- | Violet. |
| 42 | p-nitroaniline | 1-N-γ-chloro-β-hydroxypropylamino-3-methylbenzene. | Red. |
| 43 | 4-amino-3-chlorobenzene sulphonamide. | N-γ-chloro-β-hydroxypropyl-1-naphthylamine. | Bluish-red. |
| 44 | 4-amino-3-chlorophenyl methyl sulphone. | ----do---- | Rubine. |
| 45 | 2-amino-5-nitrothiazole. | 1-N-ethyl-N-γ-chloro-β-hydroxypropylamino-3-methylbenzene. | Blue. |
| 46 | 2-amino-4-methyl-5-nitrothiazole. | ----do---- | Do. |
| 47 | 2-amino-5-nitrothiazole. | 1-N-β-methoxyethyl-N-γ-chloro-β-hydroxypropylamino 3-methylbenzene. | Do. |
| 48 | 2-amino-5-nitrothiazole. | 1-N-ethyl-N-β:γ-epoxypropylamino-3-methylbenzene. | Blue. |
| 49 | ----do---- | 1-N-ethyl-N-γ-bromo-β-hydroxypropylamino-3-methylbenzene. | Do. |
| 50 | ----do---- | N-β-hydroxyethyl-N-γ-chloro-β-hydroxypropylaniline. | Reddish-blue. |
| 51 | ----do---- | 1-N:N-di(γ-chloro-β-hydroxypropyl)amino-2-methoxy-5-acetamidobenzene. | Greenish-blue. |

Example 52

20 parts of a 5% aqueous dispersion of 4-nitro-4′-(N-ethyl-N-β:γ-epoxypropyl)aminoazobenzene are mixed with 10 parts of urea, 2 parts of an aqueous emulsion of sulphonated sperm oil and pine oil, 1 part of sodium m-nitrobenesulphonate, 7 parts of water and 60 parts of a 30% aqueous solution of Nafka crystal gum. The printing paste so obtained is applied from a roller printing machine to a polyamide textile material. The polyamide textile material is dried and then exposed for 15 minutes to steam at atmospheric pressure. The printed polyamide textile material so obtained is rinsed in cold water and soaped at 80° C. in a solution containing 2 parts of soap in 1000 parts of water. The printed polyamide textile material is then rinsed in water and dried. A bright red print is obtained which has excellent fastness to washing and to light.

What we claim is:

1. Process for the coloration of synthetic polymeric textile materials selected from the class consisting of polyamide and modified polyacrylonitrile textile materials which comprises treating the said synthetic polymeric textile materials with a water-insoluble azo dyestuff containing at least one group selected from the class consisting of ω-oxiranylalkoxy, ω-oxiranylalkylamino, N:N-di(ω-oxiranylalkyl)amino, ω-chloroalkoxy, ω-bromoalkoxy, ω-chloroalkylamino, ω-bromoalkylamino, N:N-di(ω-chloroalkyl)amino, and N:N-di-(ω-bromoalkyl)amino.

2. Process as claimed in claim 1, wherein said dyestuff has an ω-chloroalkoxy group which also contains a carbinol group vicinal to the ω-carbon atom.

3. Process as claimed in claim 1, wherein said dyestuff has an ω-bromoalkoxy group which also contains a carbinol group vicinal to the ω-carbon atom.

4. Process as claimed in claim 1, wherein said dyestuff has an ω-chloroalkylamino group which also contains a carbinol group vicinal to the ω-carbon atom.

5. Process as claimed in claim 1, wherein said dyestuff has an ω-bromoalkylamino group which also contains a carbinol group vicinal to the ω-carbon atom.

6. Process as claimed in claim 1, wherein said dyestuff has an N:N-di(ω-chloroalkyl)amino group which also contains two carbinol groups each of which is vicinal to an ω-carbon atom.

7. Process as claimed in claim 1, wherein said dyestuff has an N:N-di(ω-bromoalkyl)amino group which also contains two carbinol groups each of which is vicinal to an ω-carbon atom.

8. Process as claimed in claim 1, wherein said water-insoluble azo dyestuff is applied to the synthetic polymeric textile material by dyeing.

9. Process as claimed in claim 1, wherein said water-insoluble azo dyestuff is applied to the synthetic polymeric textile material by printing.

10. Process for the coloration of synthetic polymeric textile materials selected from the class consisting of polyamide and modified polyacrylonitrile textile materials which comprises treating the said synthetic polymeric textile materials with a water-insoluble azo dyestuff of the formula:

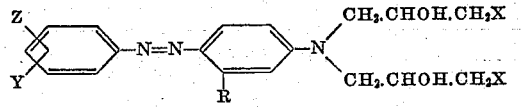

wherein R is selected from the class consisting of hydrogen, halogen, alkyl, and acylamino, X is selected from the class consisting of chlorine and bromine, Y is selected from the class consisting of cyano, alkylsulfonyl, aminosulfonyl, and substituted aminosulfonyl which is situated with respect to the azo bond in a position selected from ortho and para and Z is selected from the class consisting of hydrogen, halogen, trifluoromethyl, cyano, alkylsulfonyl, aminosulfonyl, and substituted aminosulfonyl.

11. Synthetic polymeric textile materials selected from the class consisting of polyamide and modified polyacrylonitrile textile materials colored with a water-insoluble azo dyestuff containing at least one group selected from the class consisting of ω-oxiranylalkoxy, ω-oxiranylalkylamino, N:N-di(ω-oxiranylalkyl)amino, ω-chloroalkoxy, ω-bromoalkoxy, ω-chloroalkylamino, ω-bromoalkylamino, N:N - di(ω - chloroalkyl)amino, and N:N-di(ω-bromoalkyl)amino.

No references cited.